(12) United States Patent
Li (10) Patent No.: US 12,407,384 B2
(45) Date of Patent: Sep. 2, 2025

(54) METHOD AND APPARATUS FOR SELECTING ANTENNA PANEL

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 413 days.

(21) Appl. No.: 17/631,465

(22) PCT Filed: Aug. 5, 2019

(86) PCT No.: PCT/CN2019/099291
§ 371 (c)(1),
(2) Date: Jan. 29, 2022

(87) PCT Pub. No.: WO2021/022453
PCT Pub. Date: Feb. 11, 2021

(65) Prior Publication Data
US 2022/0278719 A1    Sep. 1, 2022

(51) Int. Cl.
*H04B 7/06* (2006.01)
*H04W 4/40* (2018.01)
(Continued)

(52) U.S. Cl.
CPC ............ *H04B 7/061* (2013.01); *H04W 4/40* (2018.02); *H04W 24/08* (2013.01); *H04W 24/10* (2013.01)

(58) Field of Classification Search
CPC ...... H04B 7/061; H04B 7/0632; H04B 17/12; H04B 17/318; H04B 17/336;
(Continued)

(56) References Cited

U.S. PATENT DOCUMENTS 11,424,808 B2 * 8/2022 Cao ..................... H04B 7/0626
2014/0358835 A1   12/2014 Marti et al.
(Continued)

FOREIGN PATENT DOCUMENTS

CN    106559120 A    4/2017
CN    109845371 A    6/2019
(Continued)

OTHER PUBLICATIONS

European Patent Application No. 19940207.4, extended Search and Opinion dated Mar. 23, 2023, 10 pages.
(Continued)

*Primary Examiner* — Mounir Moutaouakil
(74) *Attorney, Agent, or Firm* — Cozen O'Connor (57) ABSTRACT

A method and an apparatus for selecting an antenna panel. A sending vehicle device: sends a first control signaling. The first control signaling includes a sending source identifier and is configured to instruct a receiving vehicle device to measure antenna panels of the sending vehicle device identified by the second source identifier. The receiving vehicle device measures the antenna panels of the sending vehicle device according to the first control signaling, and reports an antenna panel measurement result. The sending vehicle device receives the antenna panel measurement result and selects a suitable antenna panel according to the antenna panel measurement result.

16 Claims, 7 Drawing Sheets

(51) Int. Cl.
*H04W 24/08* (2009.01)
*H04W 24/10* (2009.01)

(58) Field of Classification Search
CPC .. H04B 17/309; H04B 7/0626; H04B 17/382; H04W 4/40; H04W 24/08; H04W 24/10; H04W 4/46; H04W 4/48; H04L 5/0051; H04L 5/0048; H04L 5/0053
See application file for complete search history.

(56) References Cited

U.S. PATENT DOCUMENTS

| | | | | |
|---|---|---|---|---|
| 2019/0207722 | A1* | 7/2019 | Gao | H04B 7/088 |
| 2019/0349830 | A1* | 11/2019 | Peisa | H04B 7/0617 |
| 2020/0136711 | A1* | 4/2020 | Cao | H04B 7/0626 |
| 2020/0252966 | A1* | 8/2020 | Wu | H04W 80/02 |
| 2021/0274438 | A1* | 9/2021 | Guan | H04W 52/0216 |
| 2023/0092424 | A1* | 3/2023 | Novlan | H04W 72/56 370/329 |

FOREIGN PATENT DOCUMENTS

| | | |
|---|---|---|
| EP | 3352381 A1 | 7/2018 |
| WO | WO 2019029515 A1 | 2/2019 |

OTHER PUBLICATIONS

Chinese Patent Application No. 201980001542.1, Office Action dated May 27, 2022, 6 pages.
Chinese Patent Application No. 201980001542.1, English translation of Office Action dated May 27, 2022, 9 pages.
Indian Patent Application No. 202247011714, Office Action dated Jul. 15, 2022, 5 pages.

* cited by examiner

METHOD AND APPARATUS FOR SELECTING ANTENNA PANEL

CROSS-REFERENCE TO RELATED APPLICATION

This application is the US national phase application of International Application No. PCT/CN2019/099291, filed on Aug. 5, 2019, the entire contents of which are incorporated herein by reference.

TECHNICAL FIELD

The present disclosure relates to a field of communication technologies, and more particularly, to a method and an apparatus for selecting an antenna panel, and a storage medium.

BACKGROUND

With the development of communication technology, Vehicle to Everything (V2X) technology is widely used. V2X technology is a new generation of information and communication technology that connects the vehicle with everything, where V represents the vehicle and X represents any object that interacts with the vehicle. Vehicles that communicate in V2X technology or objects that interact with vehicles may be called vehicle devices.

In the related art, in order to improve coverage, a vehicle terminal is provided with a plurality of antenna panels. For example, a panel with different directions can be set at different positions such as the left front, right front, left rear, and right rear of the vehicle. When there is one sending vehicle device and one receiving vehicle device, the sending vehicle device can use different panels for sending data to the receiving vehicle device according to different directions of the receiving vehicle device, thereby improving coverage. However, the sending vehicle device cannot determine whether the panel in the direction is a panel suitable for improving coverage. Therefore, when there are multiple panels in the sending vehicle device, it is important to determine a panel that is suitable for data transmission and reception with the receiving vehicle device, which can also improve coverage.

SUMMARY

According to a first aspect of embodiments of the present disclosure, a method for selecting an antenna panel is provided, which is performed by a sending vehicle device, and includes:

sending a first control signaling, wherein the first control signaling includes a sending source identifier, and is configured to instruct a receiving vehicle device to measure antenna panels of the sending vehicle device identified by the sending source identifier; receiving an antenna panel measurement result reported by the receiving vehicle device; and selecting an antenna panel according to the antenna panel measurement result.

According to a second aspect of embodiments of the present disclosure, a method for selecting an antenna panel is provided, which is performed by a receiving vehicle device, and includes:

detecting a first control signaling, wherein the first control signaling includes a sending source identifier, and is configured to instruct the receiving vehicle device to measure antenna panels of a sending vehicle device identified by the sending source identifier; and measure the antenna panels of the sending vehicle device identified by the sending source identifier, and reporting an antenna panel measurement result.

According to a third aspect of embodiments of the present disclosure, an apparatus for selecting an antenna panel is provided, including:

a processor; and a memory configured to store instructions executable by the processor;

wherein, the processor is configured to implement the method for selecting an antenna panel described in the first aspect.

According to a sixth aspect of embodiments of the present disclosure, an apparatus for selecting an antenna panel is provided, including:

a processor; a memory configured to store instructions executable by the processor;

wherein, the processor is configured to implement the method for selecting an antenna panel described in the second aspect.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The method for selecting an antenna panel provided by the embodiments of the present disclosure can be performed in a communication scenario of direct communication between two devices, such as a vehicle-to-other node (V2X) wireless communication scenario, and the like. V represents the vehicle device and X represents any object that interacts with the vehicle device. Currently, X mainly includes vehicle devices, handheld devices, traffic roadside infrastructure and networks. The information modes of V2X interaction include: interaction of Vehicle to Vehicle (V2V), Vehicle to Infrastructure (V2I), Vehicle to Pedestrian (V2P), and Vehicle to Network (V2N). In the present disclosure, the communication scenario of direct communication between two devices may also be a Device to Device (D2D) communication scenario. The devices that perform direct communication in embodiments of the present disclosure may include various handheld devices, vehicle devices, wearable devices, computing devices, or other processing devices connected to wireless modems with wireless communication functions, and various forms of User Equipment (UE), mobile station (MS), terminal, terminal equipment and so on. For the convenience of description, embodiments of the present disclosure are described below by taking a scenario of direct communication between vehicle devices as an example, wherein the vehicle devices that perform direct communication include a sending vehicle device as a data transmitter and a receiving vehicle device as a data receiver.

Figure 1:
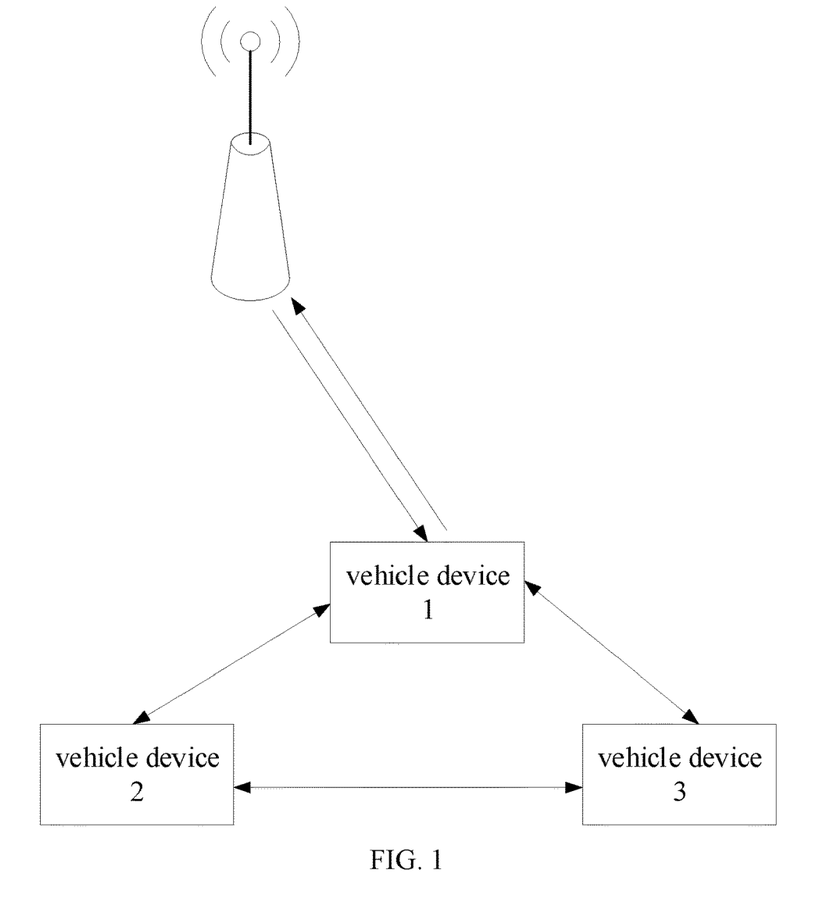
FIG. 1 is a diagram illustrating a vehicle wireless communication system according to some example embodiments.

FIG. 1 is a schematic diagram of a scenario of direct communication between vehicle devices. The network device configures various transmission parameters for data transmission for the vehicle device 1. The vehicle device 1 acts as the sending vehicle device, the vehicle device 2 and vehicle device 3 act as receiving vehicle devices, the vehicle device 1 and the vehicle device 2 perform direct communication, or the vehicle device 1 and the vehicle device 3 perform direct communication. Direct communication can also be performed between the vehicle device 2 and the vehicle device 3. The link for communication between the network device and the vehicle device is an uplink and downlink, and the link between the vehicle device and the vehicle device is a sidelink.

The vehicle device involved in the present disclosure includes one or more panels. In the Long Term Evolution (LTE) V2X, the situation that the vehicle device has multiple panels is not considered. However, in New Radio (NR) V2X, especially when the frequency band is FR2, that is, the frequency band is higher, in order to improve the coverage, the vehicle device can be provided with multiple panels. For example, a panel with different directions can be set at different positions such as the left front, right front, left rear, and right rear of the vehicle. When there are multiple panels in the sending vehicle device, the sending vehicle device cannot determine a panel that is suitable for data transmission with the receiving vehicle device and can improve coverage.

In view of this, the present disclosure provides a method for selecting an antenna panel. In the method for selecting an antenna panel, the sending vehicle device sends a control signaling, and the control signaling includes a sending source identifier. The control signaling is configured to instruct the receiving vehicle device to measure antenna panels of the sending vehicle device identified by the sending source identifier. The sending vehicle device receives an antenna panel measurement result reported by the receiving vehicle device, and selects the antenna panel suitable for sending data to the receiving vehicle device according to the antenna panel measurement result, to improve the coverage. The data sent by the sending vehicle device to the receiving vehicle device in the present disclosure includes one or more of data sent on a service channel of the sidelink, control signaling sent on the control channel, and synchronization signal blocks.

Figure 2:
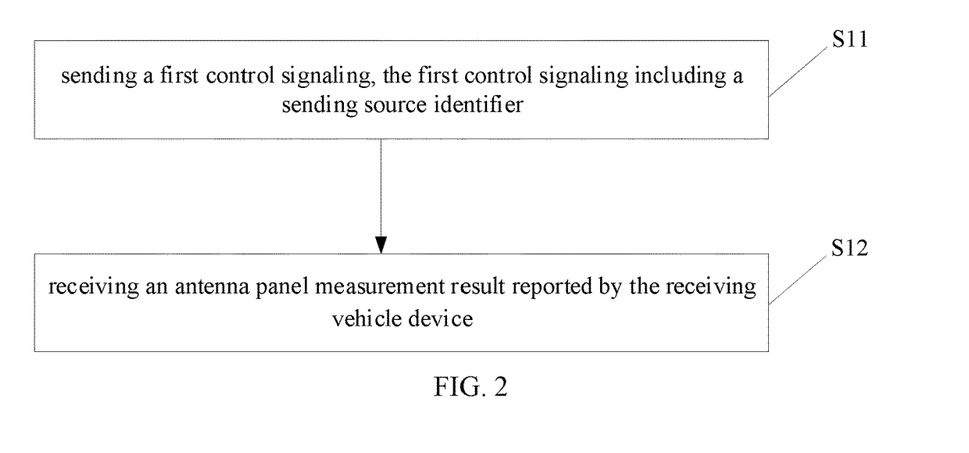
FIG. 2 is a flowchart illustrating a method for selecting an antenna panel according to an example embodiment.

FIG. 2 is a flowchart illustrating a method for selecting an antenna panel according to an example embodiment. As shown in FIG. 2, the method for selecting an antenna panel is used in a sending vehicle device, and includes the following steps.

In step S11, a control signaling is sent.

In the present disclosure, the control signaling sent by the sending vehicle device includes a sending source identifier (source ID), and the sending source ID represents the identifier of the sending vehicle device and can identify the sending vehicle device. The control signaling including the sending source identifier is configured to instruct the receiving vehicle device to measure antenna panels of the sending vehicle device identified by the sending source identifier.

In the present disclosure, for the convenience of description, the control signaling including the sending source identifier and configured to instruct the receiving vehicle device to measure the antenna panels of the sending vehicle device identified by the sending source identifier is referred to as a first control signaling.

The first control signaling involved in the above will be described below in combination with practical applications.

In an implementation, the first control signaling further includes one or more combination of a destination identifier (destination ID), an antenna panel identifier used for antenna panel measurement, a reference signal identifier used for antenna panel measurement, and a measurement result reporting configuration.

If the sending vehicle device needs to send the first control signaling to a receiving vehicle device, the destination ID may represent the ID of the receiving vehicle device. If the sending vehicle device needs to send the first control signaling to all vehicle devices in a certain vehicle device group, the destination ID may represent the ID of the receiving vehicle device group. For the receiving vehicle device, multiple IDs will also be saved, such as its own vehicle device ID and one or more vehicle device group IDs. As long as the destination ID is found to be the same as one of the multiple IDs saved by itself, it means that the receiving vehicle device itself needs to perform according to the first control signaling.

For each antenna panel of the sending vehicle device, an antenna panel identifier is configured, and one or more reference signal identifiers to be measured are configured for the antenna panel identifier. The first control signaling includes the antenna panel identifier or reference signal identifier to be measured, and then according to the antenna panel identifier or reference signal identifier to be measured, the receiving vehicle device can measure the antenna panel corresponding to the vehicle device for the resource identified by the antenna panel identifier or the reference signal identifier. In the present disclosure, the antenna panel identifier may be a numerical value, such as #0, #1; or a reference signal group identifier. Each reference signal group corresponds to one antenna panel.

On the one hand, the reference signal used for antenna panel measurement may be a synchronization signal block (SSB) of the sidelink. The SSB of the sidelink can be abbreviated as S-SSB. The identifier of the S-SSB may be a sidelink SSB resource index (S-SRI). On the other hand, the reference signal used for antenna panel measurement may also be a channel state information reference signal (CSI- RS) or a demodulation reference signal (DMRS) of the sidelink. The CSI-RS of the sidelink can be abbreviated as S-CSI-RS. The DMRS of the sidelink can be abbreviated as S-DMRS. The identifier of the S-CSI-RS may be a sidelink CSI-RS resource index (S-CRI). The identifier of the S-DMRS may be a sidelink DMRS resource index (S-DRI).

In the present disclosure, the sending vehicle device and the receiving vehicle device may pre-store a mapping relationship between the reference signal identifier and the resource of the reference signal, so as to subsequently determine the resource for antenna panel measurement through the reference signal identifier. The resource of the reference signal may be time-domain resource, frequency-domain resource, code-domain resource, beam directions, and the like. The mapping relationship between the reference signal identifier and the resource of the reference signal is stored in the form of a list, and the list can be broadcast by the sending vehicle device or the network device.

In the present disclosure, for convenience of description, the antenna panel identifier used for antenna panel measurement is referred to as the first antenna panel identifier, and the first antenna panel identifier may also be understood as the identifier of the antenna panel to be measured. The reference signal identifier used for antenna panel measurement is called the first reference signal identifier, and the first reference signal identifier may also be understood as the identifier of the reference signal to be measured.

The measurement result reporting configuration in the present disclosure may be at the reference signal level or at the antenna panel level.

If the measurement result reporting configuration is at the reference signal level, it can be understood that the reported measurement result is reported using the reference signal as the object. In the measurement result reporting configuration of the reference signal level, reference signal identifiers and reference signal measurement values can be reported, and one reference signal identifier corresponds to one reference signal measurement value. If the reference signal identifiers on respective antenna panels are different, the measurement result reporting configuration may include the reference signal identifier and the reference signal measurement value. Alternatively, if the reference signal identifiers on respective antenna panels are the same, the measurement result reporting configuration further includes the antenna panel identifier in addition to the reference signal identifier and the reference signal measurement value.

In the present disclosure, the reference signal identifier included in the measurement result reporting configuration is referred to as the second reference signal identifier, and the antenna panel identifier included in the measurement result reporting configuration is referred to as the second antenna panel identifier. The measurement result reporting configuration includes the second reference signal identifier, which indicates that the reference signal identifier needs to be included in the measurement result reported by the receiving vehicle device. The measurement result reporting configuration includes the second antenna panel identifier, which indicates that the second antenna panel identifier needs to be included in the measurement result reported by the receiving vehicle device.

In an implementation, when the measurement result reporting configuration is at the reference signal level, the measurement result reporting configuration includes, in addition to the second reference signal identifier, the reference signal measurement value, and the second antenna panel identifier, the reference signal measurement threshold, so that the receiving vehicle device reports the reference signal measurement value greater than the reference signal measurement threshold and the corresponding reference signal identifier.

In another implementation, when the measurement result reporting configuration is at the reference signal level, the measurement result reporting configuration further includes: a maximum number of reference signal measurement values reported on each antenna panel.

In the present disclosure, the reference signal measurement value may be one or more combination of layer 1-Reference signal received power (L1-RSRP), layer 1-Reference Signal Received Quality (L1-RSRQ), layer 1-Signal to Interference plus Noise Ratio (L1-SINR), and layer 1-Received Signal Strength Indicator (L1-RSSI).

If the measurement result reporting configuration is at the antenna panel level, it can be understood that the reported measurement result is reported with the antenna panel as the object. The measurement result reporting configuration of the antenna panel level may include: the second antenna panel identifier and the antenna panel measurement value; or the second reference signal identifier, the antenna panel measurement value, and the reference signal measurement value; or the second antenna panel identifier, the second reference signal identifier, the antenna panel measurement value, and the reference signal measurement value.

In an implementation, the measurement result reporting configuration at the antenna panel level further includes: a number N of reference signal measurement values used for determining the antenna panel measurement value. For example, the antenna panel measurement value is an average value or a weighted average value of the measurement values corresponding to the N reference signals with the highest measurement values on the antenna panel. N is a positive integer, and N may be 1 or greater than 1. The antenna panel measurement value may be one or more combination of L1-RSRP, L1-SINR, L1-RSRQ, L1-RSSI. For example, if the antenna panel measurement value is L1-RSRP, the L1-RSRP on the antenna panel is the average or weighted average of the L1-RSRPs corresponding to the N reference signals with the highest L1-RSRP on the antenna panel. In another implementation, the measurement result reporting configuration at the antenna panel level further includes: a reference signal measurement threshold. The antenna panel measurement value is an average value or a weighted average value of at most N reference signal measurement values on the antenna panel whose measurement values are greater than the reference signal measurement threshold. In yet another implementation, the measurement result reporting configuration at the antenna panel level further includes: the maximum number of reference signal measurement values reported on each antenna panel.

In step S12, the antenna panel measurement result reported by the receiving vehicle device is received.

In the present disclosure, the receiving vehicle device operates according to the content included in the first control signaling, for example, performs antenna panel measurement, and reports the antenna panel measurement result according to the content in the measurement result reporting configuration.

In the present disclosure, the sending vehicle device sends the first control signaling to the receiving vehicle device, where the first control signaling includes the sending source identifier and is configured to instruct the receiving vehicle device to measure the antenna panels of the sending vehicle device identified by the sending source identifier. After receiving the first control signaling, the receiving vehicle device measures the antenna panels of the sending vehicle device identified by the sending source identifier and reports the antenna panel measurement result. After receiving the antenna panel measurement result reported by the receiving vehicle device, the sending vehicle device selects a most suitable antenna panel for the receiving vehicle device. The most suitable antenna panel may be understood as an antenna panel capable of improving coverage, for example, an antenna panel with the highest measurement value included in the antenna panel measurement result. For another example, the most suitable antenna panel may be an antenna panel with a smaller load on the antenna panel included in the antenna panel measurement result according to the number of receiving vehicle devices, transmission delay, etc. In the present disclosure, after receiving the antenna panel measurement result reported by the receiving vehicle device, the sending vehicle device selects the antenna panel according to the antenna panel measurement result. After the sending vehicle device has selected an antenna panel for the receiving vehicle device, the antenna panel is the antenna panel of the sending vehicle device. The sending vehicle device can use the selected antenna panel to transmit data to the receiving vehicle device.

Figure 3:
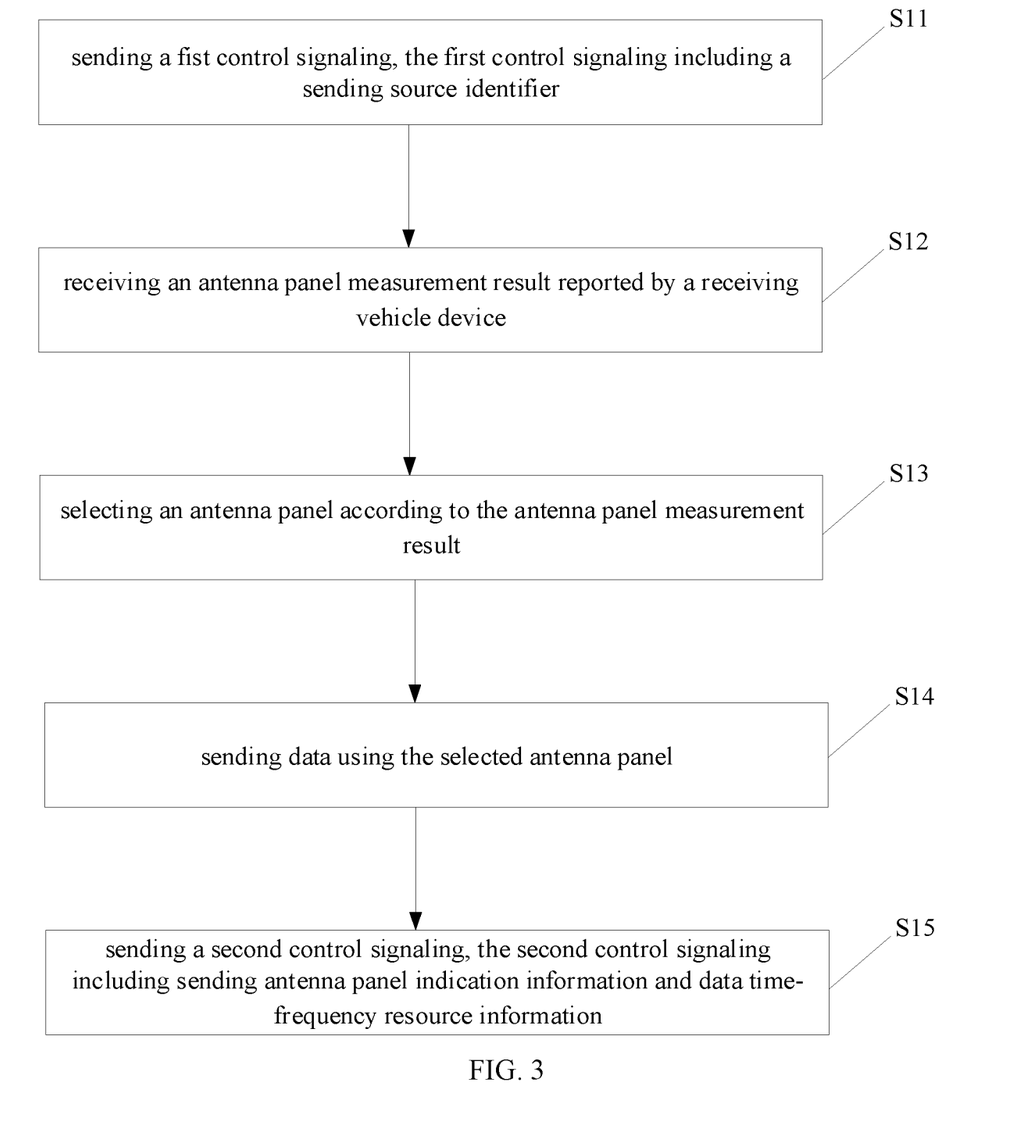
FIG. 3 is a flowchart illustrating a method for selecting an antenna panel according to an example embodiment.

FIG. 3 is a flowchart of a method for selecting an antenna panel according to an example embodiment. The method for selecting an antenna panel shown in FIG. 3 further includes the following steps on the basis of the method for selecting an antenna panel shown in FIG. 2.

In step S13, an antenna panel is selected according to the antenna panel measurement result.

In step S14, data is transmitted using the selected antenna panel.

In the present disclosure, the sending vehicle device uses the selected antenna panel to transmit data, and the sending vehicle device can also send the control signaling to indicate indication information of the selected antenna panel and time-frequency resource information for transmitting data, to the receiving vehicle device.

In the present disclosure, the control signaling including antenna panel indication information and data time-frequency resource information is referred to as the second control signaling.

In step S15, the second control signaling is sent. The second control signaling includes sending antenna panel indication information and data time-frequency resource information.

In the present disclosure, the second control signaling is sent using one or more antenna panels. The antenna panel that sends the second control signaling and the antenna panel that sends data are the same or different antenna panels, or the antenna panel that sends the second control signaling includes but is not limited to the antenna panel that sends data.

The sending antenna panel indication information is configured to indicate the sending antenna panel.

Further, in the present disclosure, the sending antenna panel indication information includes a sending antenna panel identifier, so as to indicate the sending antenna panel through the sending antenna panel identifier. There may be one or more sending antenna panel identifier. For example, when the receiving vehicle device is in front of the sending vehicle device, two antenna panels on the left front and the right front of the sending vehicle device may be indicated, and these two sending antenna panels are used together to send data to the receiving vehicle device.

Further, in the present disclosure, when the vehicle device moves fast and the beam update is too late, the antenna panel indication information is used to indicate the antenna panel used for sending data to each receiving vehicle device. It can be understood that, in the case that the vehicle device moves slowly, the transmitting beam on the antenna panel for transmitting data can be further indicated.

Figure 4:
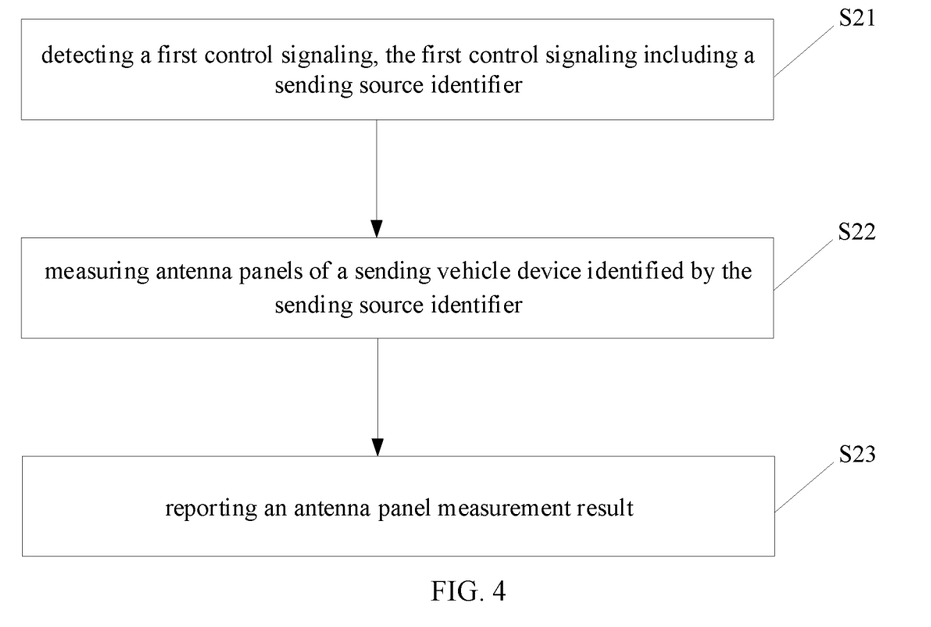
FIG. 4 is a flowchart illustrating a method for selecting an antenna panel according to an example embodiment.

FIG. 4 is a flowchart of a method for selecting an antenna panel according to an example embodiment. The method for selecting an antenna panel shown in FIG. 4 is performed by the receiving vehicle device, including the following steps.

In step S21, the first control signaling is detected. The first control signaling includes the sending source identifier, and is configured to instruct the receiving vehicle device to measure antenna panels of the sending vehicle device identified by the sending source identifier.

In the present disclosure, the receiving vehicle device can always detect the first control signaling on the time-frequency resource for sending the first control signaling. The time-frequency resource for sending the first control signaling may be broadcast by the sending vehicle device or the network device, or may be pre-configured.

After detecting the first control signaling, the receiving vehicle device performs the operation indicated by the first control signaling.

In an implementation, the first control signaling includes the sending source identifier, and performing the operation indicated by the first control signaling may be: measuring antenna panels of the sending vehicle device identified by the sending source identifier.

In another implementation, the first control signaling includes a destination identifier. Performing the operation indicated by the first control signaling may be: before measuring the antenna panels of the sending vehicle device identified by the sending source identifier, determining that the destination identifier included in the first control signaling exists in a stored list of existing destination identifiers.

In the present disclosure, the destination identifier of the receiving vehicle device may be pre-configured. For example, a destination identifier set or list of the receiving vehicle device is configured by a higher layer such as the application layer. The destination identifier set or list may include the identifier of the receiving vehicle device itself, or may include the destination identifier of one or more receiving vehicle device groups joined by the receiving vehicle device, in which each receiving vehicle device group corresponds to a destination identifier. The receiving vehicle device stores the pre-configured destination identifier list as the existing destination identification list. When the receiving vehicle device detects that the destination identifier in the first control signaling is the same as one in the existing destination identifier set or list stored by itself, the receiving vehicle device determines to perform the operation indicated in the first control signaling.

In an implementation, the first control signaling includes a first reference signal identifier, or the first control signaling includes a first reference signal identifier and a first antenna panel identifier. Performing the operation indicated by the first control signaling may be: determining a time-frequency resource location corresponding to the reference signal identified by the first reference signal identifier, and measuring the measurement value of the reference signal on the antenna panel of the vehicle-mounted device identified by the sending source identifier at the time-frequency resource location.

In step S22, antenna panels of the sending vehicle device identified by the sending source identifier are measured.

When the receiving vehicle device determines that the stored list of existing destination identifiers includes the destination identifier in the first control signaling, then according to the first reference signal identifier included in the first control signaling, or according to the first reference signal identifier and the first antenna panel identifier included in the first control signaling, the time-frequency resource location corresponding to the first reference signal is determined, and then the measurement value of each reference signal is measured at the time-frequency resource location, such as measuring a combination of one or more of L1-RSRP, L1-SINR, L1-RSRQ, and L1-RSSI.

In step S23, the antenna panel measurement result is reported.

In yet another implementation, the first control signaling further includes a measurement result reporting configuration. Performing the operation indicated by the first control signaling may be: according to the measurement result reporting configuration, reporting content that matches the measurement result reporting configuration.

The content matching the measurement result reporting configuration includes: a second reference signal identifier and a reference signal measurement value; or the second antenna panel identifier, the second reference signal identifier, and the reference signal measurement value; or the second antenna panel identifier and the antenna panel measurement value; or the second reference signal identifier, the antenna panel measurement value, and the reference signal measurement value; or the second antenna panel identifier, the second reference signal identifier, the antenna panel measurement value, and the reference signal measurement value.

For example, the reported antenna panel measurement result is the second reference signal identifier (or may also include the second antenna panel identifier)+the reference signal measurement value. At most M second reference signal identifiers and corresponding reference signal measurement values are fed back on each antenna panel. M is a positive integer greater than or equal to 1. In this way, the sending vehicle device can also obtain the measurement value of each antenna panel by using one or more reference signal measurement values on each antenna panel, so as to select a suitable antenna panel for sending data to the receiving device. Moreover, the beam direction corresponding to the suitable reference signal on the suitable antenna panel can also be further selected for sending data to the receiving device.

For another example, the reported antenna panel measurement result is the second antenna panel identifier+the antenna panel measurement value. The antenna panel measurement value is the average value of the measurement values of N reference signals with the largest measurement values (or at most N reference signals whose measurement value is greater than the reference signal measurement threshold) on the antenna panel. For example, the antenna panel measurement value is the L1-RSRP of the antenna panel obtained as the average of the N largest L1-RSRPs. Or, for example, the antenna panel measurement value is the L1-SINR of the antenna panel obtained as the average of the N largest L1-SINRs. Or, for example, the antenna panel measurement value is the L1-RSRQ of the antenna panel obtained as the average of the N largest L1-RSRQs. For example, the antenna panel measurement value is the L1-RSSI of the antenna panel obtained as the average of the N largest L1-RSSIs. In this way, the sending vehicle device can select a suitable antenna panel for sending data to the receiving vehicle device according to the measurement value of each antenna panel.

For another example, the reported antenna panel measurement result is the second antenna panel identifier+the antenna panel measurement value+the second reference signal identifier+the reference signal measurement value, so that in addition to selecting a suitable antenna panel for sending data to the receiving vehicle device, the sending vehicle device can further select a suitable beam direction on the suitable antenna panel for sending data to the receiving vehicle device.

For the content that matches the measurement result reporting configuration, where the description here is not detailed enough, please refer to the above description about the measurement result reporting configuration.

Further, in the present disclosure, when reporting the antenna panel measurement result, it also carries the sending source identifier (the identifier of the receiving vehicle device) and the destination identifier (the identifier of the sending vehicle device).

Figure 5:
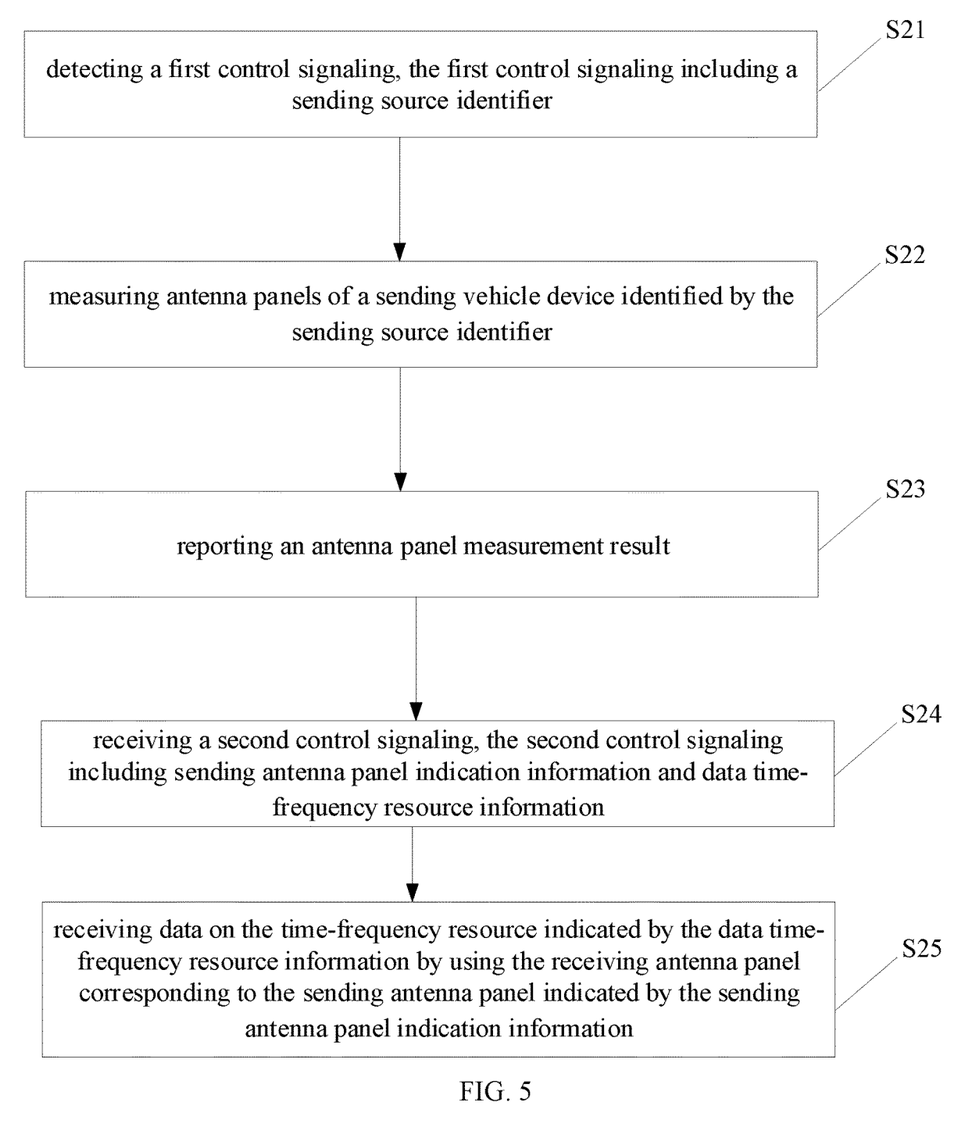
FIG. 5 is a flowchart illustrating a method for selecting an antenna panel according to an example embodiment.

FIG. 5 is a flowchart illustrating a method for selecting an antenna panel according to an example embodiment. The method for selecting an antenna panel shown in FIG. 5 further includes the following steps on the basis of the method shown in FIG. 4.

In step S24, the second control signaling is received. The second control signaling includes sending antenna panel indication information and data time-frequency resource information.

In the present disclosure, the receiving vehicle device performs detection on the time-frequency resource for sending the second control signaling. When the second control signaling sent by the sending vehicle device is detected, the time-frequency resource information for subsequently receiving data and the like are determined according to the data time-frequency resource information included in the second control signaling. When the second control signaling sent by the sending vehicle device is detected, the antenna panel information of the subsequent data is determined according to the sending antenna panel indication information included in the second control signaling. For example, the sending antenna panel used by the sending vehicle device is determined according to the sending antenna panel indication information, and the receiving antenna panel suitable for receiving the data sent by the sending antenna panel is determined according to the sending antenna panel. The receiving antenna panel suitable for receiving the data sent by the sending antenna panel may be the receiving antenna panel determined when measuring the sending antenna panel of the sending vehicle device identified by the sending source identifier involved in the above method embodiments, for example, may be the receiving antenna panel with the highest measurement value determined when measuring the sending antenna panel of the sending vehicle device identified by the sending source identifier. For example, the sending vehicle device uses panel #0 to send reference signal #0, and when measuring the antenna panels of the sending vehicle device identified by the sending source identifier, the receiving vehicle device determines that the signal is strongest when the receiving vehicle device uses panel #1 to receive the reference signal sent by panel #0, then the corresponding receiving antenna panel of the receiving vehicle device is panel #1 when the sending antenna panel indication information indicates that the sending antenna panel of the sending vehicle device is panel #0.

In step S25, data is received on the time-frequency resource indicated by the data time-frequency resource information by using the receiving antenna panel corresponding to the sending antenna panel indicated by the sending antenna panel indication information.

In the present disclosure, the receiving vehicle device uses the receiving antenna panel corresponding to the sending antenna panel indicated by the sending antenna panel indication information to receive the data sent by the sending vehicle device. For example, the sending vehicle device uses panel #0 to send reference signal #0, and when the receiving vehicle device measures the antenna panels of the sending vehicle device identified by the sending source identifier, it is determined that the signal is the strongest when the receiving vehicle device uses panel #1 to receive the reference signal sent by panel #0, then the receiving vehicle device uses panel #1 to receive subsequent data on the time-frequency resource indicated by the data time-frequency resource information when the antenna panel information indicated by the sending vehicle device is panel #0.

In the present disclosure, when the sending vehicle device sends data, the sending antenna panel is indicated through the sending antenna panel indication information in the second control signaling. The receiving vehicle device determines the receiving antenna panel suitable for receiving the data sent by the sending antenna panel indicated by the sending antenna panel indication information according to the sending antenna panel indicated by the sending antenna panel indication information and the measurement result of the antenna panel measurement performed according to the first control signaling, to improve coverage.

Figure 6:
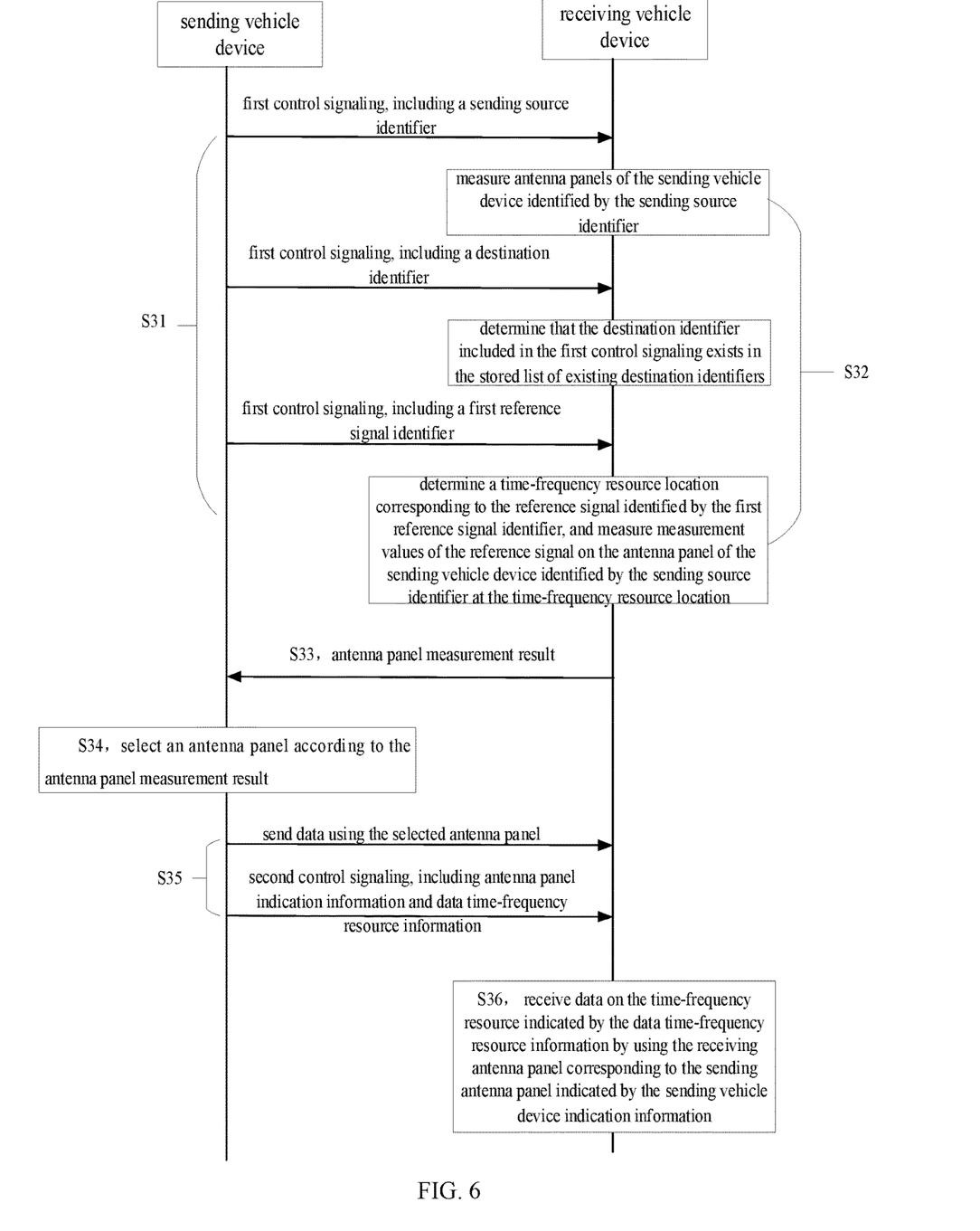
FIG. 6 is a flowchart illustrating a method for selecting an antenna panel according to an example embodiment.

FIG. 6 is a flowchart showing a method for selecting an antenna panel according to an example embodiment. The method for selecting an antenna panel shown in FIG. 6 is used in the interaction between the sending vehicle device and the receiving vehicle device. Referring to FIG. 6, the method for selecting an antenna panel includes the following steps.

In step S31, the sending vehicle device sends the first control signaling.

In step S32, the receiving vehicle device detects the first control signaling, and performs the operation indicated by the first control signaling when the first control signaling is detected.

On one hand, the first control signaling sent by the sending vehicle device includes the sending source identifier, and is configured to instruct the receiving vehicle device to measure the antenna panels of the sending vehicle device identified by the sending source identifier. The operation performed by the receiving vehicle device according to the first control signaling may be: measuring the antenna panels of the sending vehicle device identified by the sending source identifier.

On the other hand, the destination identifier is included in the first control signaling sent by the sending vehicle device. The operation performed by the receiving vehicle device according to the first control signaling may be: before measuring the antenna panels of the sending vehicle device identified by the sending source identifier, determining that the destination identifier included in the first control signaling exists in the stored list of existing destination identifiers.

On the other hand, the first control signaling sent by the sending vehicle device includes the first reference signal identifier. The operation performed by the receiving vehicle device according to the first control signaling may be: determining a time-frequency resource location corresponding to the reference signal identified by the first reference signal identifier, and measuring measurement values of the reference signal on the antenna panel of the sending vehicle device identified by the sending source identifier at the time-frequency resource location.

In step S33, the antenna panel measurement result reported by the receiving vehicle is received. The receiving vehicle device receives the antenna panel measurement result.

In an implementation, the first control signaling further includes a measurement result reporting configuration. The operation performed by the receiving vehicle device according to the first control signaling may be: according to the measurement result reporting configuration, reporting the content matching the measurement result reporting configuration.

In step S34, the sending vehicle device selects the antenna panel according to the antenna panel measurement result.

In step S35, the sending vehicle device sends data using the selected antenna panel. The sending vehicle device sends a second control signaling, where the second control signaling includes antenna panel indication information and data time-frequency resource information.

In step S36, the receiving vehicle device receives the second control signaling. The receiving vehicle device receives data on the time-frequency resource indicated by the data time-frequency resource information by using the receiving antenna panel corresponding to the sending antenna panel indicated by the sending vehicle device indication information.

In the present disclosure, the sending vehicle device sends the first control signaling configured to instruct the receiving vehicle device to measure the antenna panels of the sending vehicle device identified by the sending source identifier, and the first control signaling includes the sending source identifier. The sending vehicle device receives the antenna panel measurement result reported by the receiving vehicle device, and according to the antenna panel measurement result, selects an antenna panel suitable for sending data to the receiving vehicle device, and uses the selected antenna panel to send data to the receiving vehicle device, to improve coverage.

Based on the same concept, embodiments of the present disclosure further provide an apparatus for selecting an antenna panel.

It can be understood that, in order to implement the above-mentioned functions, the apparatus for selecting an antenna panel provided by the embodiments of the present disclosure includes corresponding hardware structures and/or software modules for executing each function. Combining with the units and algorithm steps of each example disclosed in the embodiments of the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 7:
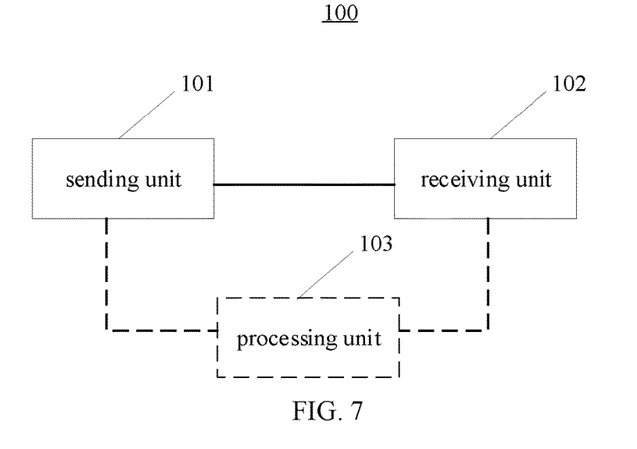
FIG. 7 is a block diagram illustrating an apparatus for selecting an antenna panel according to an example embodiment.

FIG. 7 is a block diagram of an apparatus for selecting an antenna panel provided according to an example embodiment. Referring to FIG. 7, the apparatus 100 for selecting an antenna panel is performed by a sending vehicle device, and includes a sending unit 101 and a receiving unit 102.

The sending unit 101 is configured to send a first control signaling, wherein the first control signaling includes a sending source identifier, and is configured to instruct a receiving vehicle device to measure antenna panels of the sending vehicle device identified by the sending source identifier. The receiving unit 102 is configured to receive an antenna panel measurement result reported by the receiving vehicle device.

Further, the apparatus 100 for selecting an antenna panel further includes a processing unit 103, configured to select an antenna panel according to the antenna panel measurement result.

In an implementation, the first control signaling further includes one or more combination of a destination identifier, a first antenna panel identifier, a first reference signal identifier, and a measurement result reporting configuration.

In another implementation, the measurement result reporting configuration includes: a second reference signal identifier and a reference signal measurement value; or a second antenna panel identifier, a second reference signal identifier, and a reference signal measurement value.

In yet another implementation, the measurement result reporting configuration further includes: a reference signal measurement threshold; and/or a maximum number of reference signal measurement values reported on each antenna panel.

In yet another implementation, the measurement result reporting configuration includes: a second antenna panel identifier and an antenna panel measurement value; or a second antenna panel identifier, an antenna panel measurement value, and a reference signal measurement value; or a second antenna panel identifier, a second reference signal identifier, an antenna panel measurement value, and a reference signal measurement value.

In yet another implementation, the measurement result reporting configuration further comprises at least one of following configuration information: a reference signal measurement threshold; a maximum number of reference signal measurement values reported on each antenna panel; a number of reference signal measurement values used for determining an antenna panel measurement value.

In yet another implementation, the sending unit 101 is further configured to send a second control signaling, wherein the second control signaling includes sending antenna panel indication information and data time-frequency resource information. The sending unit 101 is further configured to send data using a selected antenna panel.

In yet another implementation, the sending unit 101 is configured to send the second control signaling using one or more antenna panels.

Figure 8:
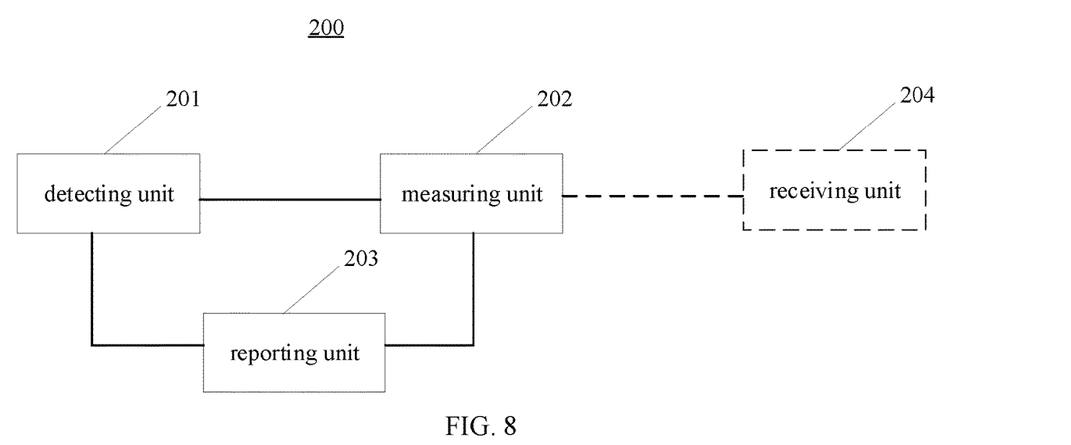
FIG. 8 is a block diagram illustrating an apparatus for selecting an antenna panel according to an example embodiment.

FIG. 8 is a block diagram of an apparatus for selecting an antenna panel provided according to an example embodiment of the present disclosure. Referring to FIG. 8, the apparatus 200 for selecting an antenna panel is performed by a receiving vehicle device, and includes a detecting unit 201, a measuring unit 202 and a reporting unit 203.

The detecting unit 201 is configured to detect a first control signaling, wherein the first control signaling includes a sending source identifier, and is configured to instruct the receiving vehicle device to measure antenna panels of a sending vehicle device identified by the sending source identifier. The measuring unit 202 is configured to measure the antenna panels of the sending vehicle device identified by the sending source identifier. The reporting unit 203 is configured to report an antenna panel measurement result.

In an implementation, the first control signaling further includes a destination identifier.

The detecting unit 201 is further configured to determine that the destination identifier exists in a stored list of existing destination identifiers before the measuring unit 202 measures antenna panels of the sending vehicle device identified by the sending source identifier.

In another implementation, the first control signaling further includes a first reference signal identifier.

The measuring unit 202 is configured to: determine a time-frequency resource location corresponding a reference signal identified by the first reference signal identifier; measure a measurement value of the reference signal on the antenna panel of the sending vehicle device identified by the sending source identifier at the time-frequency resource location.

In yet another implementation, the first control signaling further includes a measurement result reporting configuration.

The reporting unit 203 is configured to report content that matches the measurement result reporting configuration according to the measurement result reporting configuration.

In yet another implementation, the content that matches the measurement result reporting configuration includes:

a second reference signal identifier and a reference signal measurement value; or a second antenna panel identifier, a second reference signal identifier, and a reference signal measurement value; or a second antenna panel identifier and an antenna panel measurement value; or a second reference signal identifier, an antenna panel measurement value, and a reference signal measurement value; or a second antenna panel identifier, a reference signal identifier, an antenna panel measurement value, and a reference signal measurement value.

In yet another implementation, the apparatus for selecting an antenna panel 200 further includes a receiving unit 204. The receiving unit 204 is configured to:

receive a second control signaling, wherein the second control signaling includes sending antenna panel indication information and data time-frequency resource information; and receive data on time-frequency resource indicated by the data time-frequency resource information by using a receiving antenna panel corresponding to a sending antenna panel indicated by the sending antenna panel indication information, wherein the receiving antenna panel corresponding to the sending antenna panel is an antenna panel determined when measuring the antenna panels of the sending vehicle device identified by the sending source identifier.

Regarding the apparatus in the above embodiment, the specific manner in which each module performs operations has been described in detail in the embodiments of the method, and will not be described in detail here.

Figure 9:
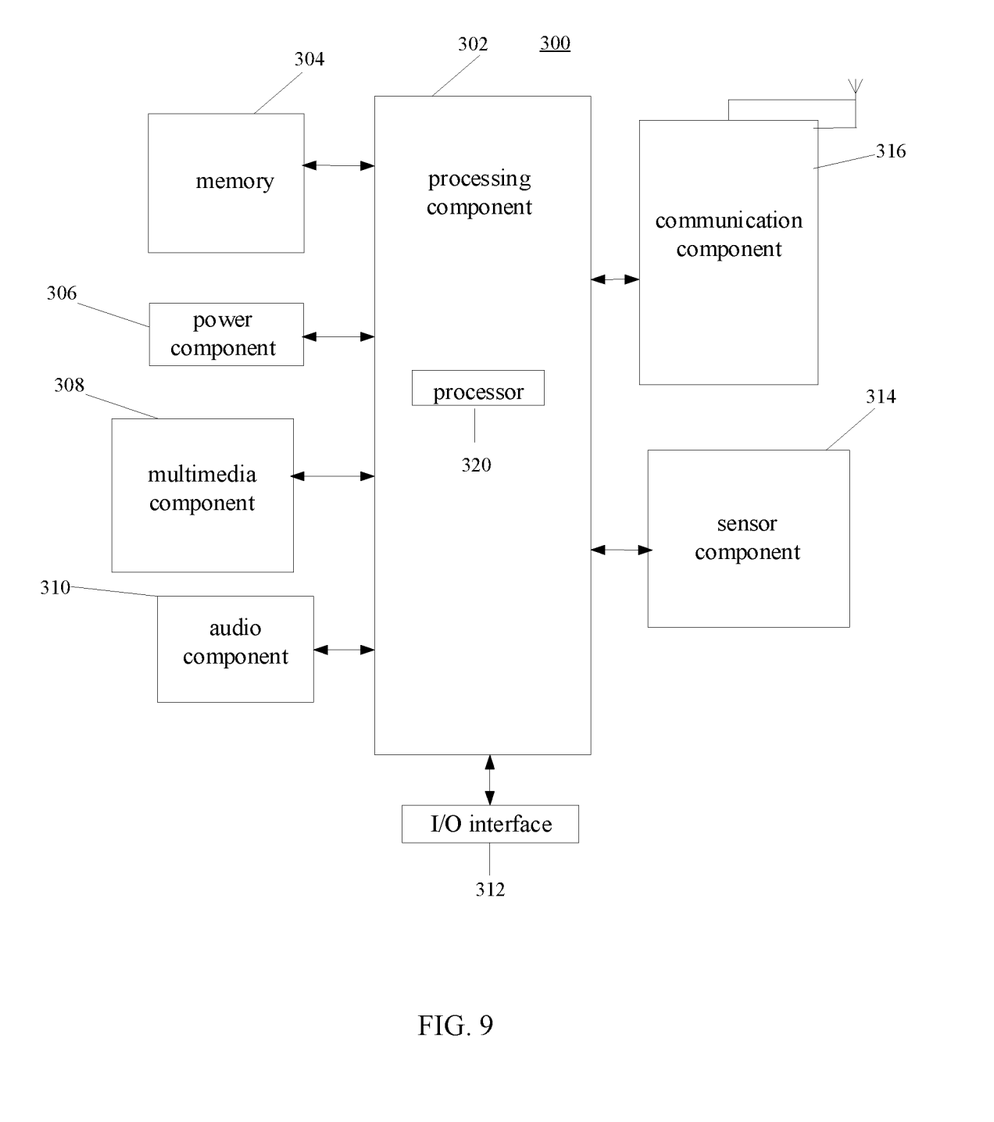
FIG. 9 is a block diagram illustrating an apparatus according to an example embodiment.

FIG. 9 is a block diagram illustrating an apparatus 300 for selecting an antenna panel according to an example embodiment. the apparatus 300 is performed by a sending vehicle device or a receiving vehicle device. The sending vehicle device or the receiving vehicle device may be a terminal. For example, the apparatus 300 may be a mobile phone, a computer, a digital broadcasting terminal, a messaging device, a game console, a tablet device, a medical equipment, a fitness equipment, a personal digital assistant, etc.

Referring to FIG. 9, the apparatus 300 may include one or more components: a processing component 302, a memory 304, a power component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of blocks of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power component 306 may provide power for all components of the apparatus 300. The power component 306 may include power supply management system, one or more power supplies, and other units related to generating, managing and distributing power for the apparatus 300.

The multimedia component 308 includes an output interface screen provided between the apparatus 300 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touch, slide and gestures on the touch panel. The touch sensor may not only sense the boundary of the touch or slide action, but also detect the duration and pressure related to the touch or slide operation. In some embodiments, the multimedia component 308 includes a front camera and/or a rear camera. When the apparatus 300 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 310 is configured to output and/or input a signal. For example, the audio component 310 includes a microphone (MIC). When the apparatus 300 is in operation mode, such as call mode, record mode, and speech recognition mode, the microphone is configured to receive the external audio signals. The audio signal received may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The button may include but not limited to a home button, a volume button, a start button and a lock button.

The sensor component 314 includes one or more sensors, configured to provide various aspects of status assessment for the apparatus 300. For example, the sensor component 314 may detect the on/off state of the apparatus 300 and the relative positioning of the component. For example, the component is a display and a keypad of the apparatus 300. The sensor component 314 may further detect the position change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on a communication standard, such as WiFi, 2G or 3G, 4G LTE, 5G NR or their combination. In an example embodiment, the communication component 316 receives a broadcast signal or broadcast-related information from an external broadcast management system via a broadcast channel. In an example embodiment, the communication component 316 further includes a near field communication (NFC) module to facilitate short-range communication. For example, the NFC module may be achieved based on an RFID technology, an IrDA technology, a UWB technology, a BT technology and other technologies.

In an example embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the method as described in the above any embodiment.

In an example embodiment, the apparatus 300 includes the processor 320 and the memory 304 configured to store instructions executable by the processor. The processor 320 is configured to implement the method described above.

In an example embodiment, a non-transitory computer readable storage medium including instructions is further provided, such as a memory 304 including instructions, the instructions may be executed by the processor 320 of the apparatus 300 to complete the above method. For example, the non-transitory computer readable storage medium may be a ROM, a random access memory (RAM), a CD-ROM, a magnetic tape, a floppy disk, an optical data storage device, etc.

It should be understood that, "multiple" mentioned in this disclosure refers to two or more. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a," "the," and "said" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the present disclosure.

It should be understood that although the operations in the embodiments of the present disclosure are described in a specific order in the drawings, it should not be construed as requiring that the operations be performed in the specific order shown or serially, or that all the operations shown are performed to obtain the desired result. In certain circumstances, multitasking and parallel processing may be advantageous.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for selecting an antenna panel, performed by a sending vehicle device, comprising:
    sending a first control signaling, wherein the first control signaling comprises a sending source identifier, and is configured to instruct a receiving vehicle device to measure antenna panels of the sending vehicle device identified by the sending source identifier;
    receiving an antenna panel measurement result reported by the receiving vehicle device; and
    selecting an antenna panel according to the antenna panel measurement result;
    wherein the first control signaling further comprises a measurement result reporting configuration, wherein the measurement result reporting configuration is configured to instruct the receiving vehicle device to report an antenna panel measurement result at a reference signal level or at an antenna panel level; wherein the measurement result reporting configuration corresponding to the reference signal level comprises:
    a second reference signal identifier and a reference signal measurement value; or
    a second antenna panel identifier, a second reference signal identifier, and a reference signal measurement value; and
    the measurement result reporting configuration corresponding to the antenna panel level comprises:
    a second antenna panel identifier and an antenna panel measurement value; or
    a second antenna panel identifier, an antenna panel measurement value, and a reference signal measurement value; or
    a second antenna panel identifier, a second reference signal identifier, an antenna panel measurement value, and a reference signal measurement value.

2. The method of claim 1, wherein the measurement result reporting configuration corresponding to the reference signal level further comprises at least one of:
    a reference signal measurement threshold; or
    a maximum number of reference signal measurement values reported on each antenna panel.

3. The method of claim 1, wherein the measurement result reporting configuration corresponding to the antenna panel level further comprises at least one of:
    a reference signal measurement threshold;
    a maximum number of reference signal measurement values reported on each antenna panel; or
    a number of reference signal measurement values used for determining an antenna panel measurement value.

4. The method of claim 1, further comprising:
    sending a second control signaling, wherein the second control signaling comprises sending antenna panel indication information and data time-frequency resource information; and
    sending data using a selected antenna panel.

5. The method of claim 4, wherein, sending the second control signaling comprises:
    sending the second control signaling using one or more antenna panels.

6. The method of claim 1, wherein the first control signaling further comprises one or more combination of a destination identifier, a first antenna panel identifier, or a first reference signal identifier.

7. A method for selecting an antenna panel, performed by a receiving vehicle device, comprising:
    detecting a first control signaling, wherein the first control signaling comprises a sending source identifier, and is configured to instruct the receiving vehicle device to measure antenna panels of a sending vehicle device identified by the sending source identifier; and
    measuring the antenna panels of the sending vehicle device identified by the sending source identifier, and reporting an antenna panel measurement result;
    wherein the first control signaling further comprises a measurement result reporting configuration, wherein the measurement result reporting configuration is configured to instruct the receiving vehicle device to report an antenna panel measurement result at a reference signal level or at an antenna panel level; wherein the measurement result reporting configuration corresponding to the reference signal level comprises:
    a second reference signal identifier and a reference signal measurement value; or
    a second antenna panel identifier, a second reference signal identifier, and a reference signal measurement value; and
    the measurement result reporting configuration corresponding to the antenna panel level comprises:
    a second antenna panel identifier and an antenna panel measurement value; or
    a second antenna panel identifier, an antenna panel measurement value, and a reference signal measurement value; or
    a second antenna panel identifier, a second reference signal identifier, an antenna panel measurement value, and a reference signal measurement value.

8. The method of claim 7, wherein, the first control signaling further comprises a destination identifier;
    before measuring the antenna panels of the sending vehicle device identified by the sending source identifier, the method further comprises:
    determining that the destination identifier exists in a stored list of existing destination identifiers.

9. The method of claim 7, wherein, the first control signaling further comprises a first reference signal identifier;

measuring the antenna panels of the sending vehicle device identified by the sending source identifier comprises:

determining a time-frequency resource location corresponding a reference signal identified by the first reference signal identifier;

measuring a measurement value of the reference signal on the antenna panel of the sending vehicle device identified by the sending source identifier at the time-frequency resource location.

10. The method of claim 7, wherein, the first control signaling further comprises a measurement result reporting configuration;

reporting the antenna panel measurement result comprises:

reporting content that matches the measurement result reporting configuration according to the measurement result reporting configuration.

11. The method of claim 10, wherein, the content that matches the measurement result reporting configuration comprises:

a second reference signal identifier and the reference signal measurement value; or a second antenna panel identifier, the second reference signal identifier, and the reference signal measurement value; or the second antenna panel identifier and an antenna panel measurement value; or the second reference signal identifier, an antenna panel measurement value, and the reference signal measurement value; or the second antenna panel identifier, a reference signal identifier, the antenna panel measurement value, and the reference signal measurement value.

12. The method of claim 7, further comprising:

receiving a second control signaling, wherein the second control signaling comprises sending antenna panel indication information and data time-frequency resource information; and receiving data on time-frequency resource indicated by the data time-frequency resource information by using a receiving antenna panel corresponding to a sending antenna panel indicated by the sending antenna panel indication information, wherein the receiving antenna panel corresponding to the sending antenna panel is an antenna panel determined when measuring the antenna panels of the sending vehicle device identified by the sending source identifier.

13. An apparatus for selecting an antenna panel, comprising:

a processor;

a memory configured to store instructions executable by the processor;

wherein, the processor is configured to implement the method for selecting an antenna panel of claim 7.

14. An apparatus for selecting an antenna panel, comprising:

a memory configured to store instructions executable by a processor;

wherein, the processor is configured to implement following operations by executing the instructions stored in the memory:

sending a first control signaling, wherein the first control signaling comprises a sending source identifier, and is configured to instruct a receiving vehicle device to measure antenna panels of the sending vehicle device identified by the sending source identifier;

receiving an antenna panel measurement result reported by the receiving vehicle device; and selecting an antenna panel according to the antenna panel measurement result;

wherein the first control signaling further comprises a measurement result reporting configuration, wherein the measurement result reporting configuration is configured to instruct the receiving vehicle device to report an antenna panel measurement result at a reference signal level or at an antenna panel level; wherein the measurement result reporting configuration corresponding to the reference signal level comprises:

a second reference signal identifier and a reference signal measurement value; or a second antenna panel identifier, a second reference signal identifier, and a reference signal measurement value; and the measurement result reporting configuration corresponding to the antenna panel level comprises:

a second antenna panel identifier and an antenna panel measurement value; or a second antenna panel identifier, an antenna panel measurement value, and a reference signal measurement value; or a second antenna panel identifier, a second reference signal identifier, an antenna panel measurement value, and a reference signal measurement value.

15. The apparatus of claim 14, wherein the processor is further configured to:

send a second control signaling, wherein the second control signaling comprises sending antenna panel indication information and data time-frequency resource information; and send data using a selected antenna panel.

16. The apparatus of claim 15, wherein the processor is further configured to:

send the second control signaling using one or more antenna panels.

* * * * *